United States Patent
Tolliver et al.

(10) Patent No.: US 7,802,654 B2
(45) Date of Patent: ***Sep. 28, 2010

(54) OPERABLE CLIMBING TREE STAND

(76) Inventors: Randy Tolliver, 2612 Ash Dr., Carleton, MI (US) 48117; Robert Tolliver, 200 Indiana St., Carleton, MI (US) 48117

( * ) Notice: Subject to any disclaimer, the term of this patent is extended or adjusted under 35 U.S.C. 154(b) by 1206 days.

This patent is subject to a terminal disclaimer.

(21) Appl. No.: 11/279,122

(22) Filed: Apr. 10, 2006

(65) Prior Publication Data
US 2007/0235260 A1 Oct. 11, 2007

(51) Int. Cl.
*A63B 27/00* (2006.01)
(52) U.S. Cl. ............ 182/136; 182/135; 182/134; 182/20
(58) Field of Classification Search ............ 182/20, 182/134, 187, 135, 136
See application file for complete search history.

(56) References Cited

U.S. PATENT DOCUMENTS

| | | | | |
|---|---|---|---|---|
| 3,485,320 A | * | 12/1969 | Jones | ............ 182/129 |
| 3,960,240 A | | 6/1976 | Cotton | |
| 4,553,634 A | * | 11/1985 | Roberts et al. | ............ 182/134 |
| 4,802,552 A | | 2/1989 | Williams | |
| 4,890,694 A | | 1/1990 | Williams | |
| 4,953,662 A | | 9/1990 | Porter | |
| 5,167,298 A | * | 12/1992 | Porter | ............ 182/187 |
| 5,379,861 A | * | 1/1995 | Amacker | ............ 182/187 |
| 6,988,588 B2 | | 1/2006 | Prejean | |
| 7,377,361 B1 | * | 5/2008 | Tschida | ............ 182/188 |

FOREIGN PATENT DOCUMENTS

EP 404705 A2 * 12/1990

* cited by examiner

*Primary Examiner*—Katherine W Mitchell
*Assistant Examiner*—Candace L. Bradford
(74) *Attorney, Agent, or Firm*—McPherson IP Law Office, PLLC

(57) ABSTRACT

A climbing tree stand platform includes a platform member having a back member and a front member separated by a first side member and a second side member, a first arm and a second arm that each extend angularly upward from the platform toward the back member, and a securing member connected between the first arm and the second arm. A first elasticized member having a first end is connected to the platform member toward the first side member and a second elasticized member having a first end is connected to the platform member toward the second side member. The back member of the platform member may selectively engage an upright support or tree while the securing member selectively surrounds it, thereby providing cantilevered support for the platform member. The first elasticized member and the second elasticized member are operatively attachable to a second platform member. A climbing tree stand system is also provided.

19 Claims, 4 Drawing Sheets

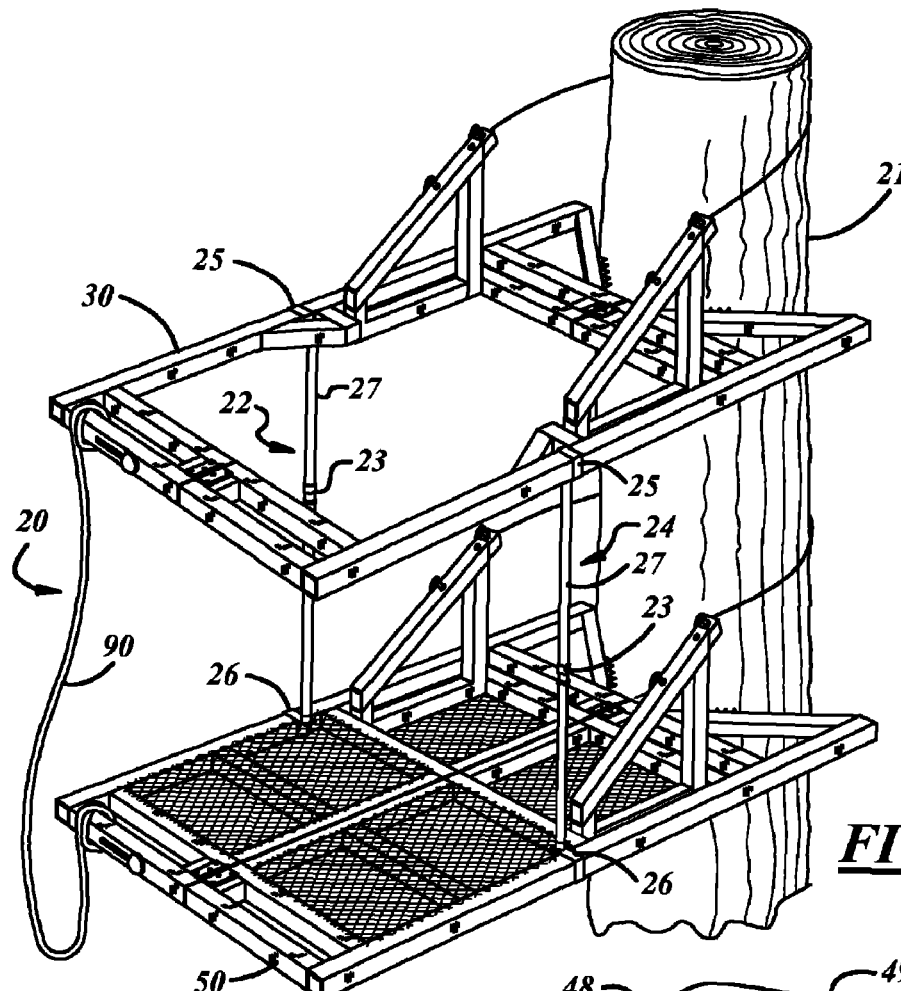
FIG. 1
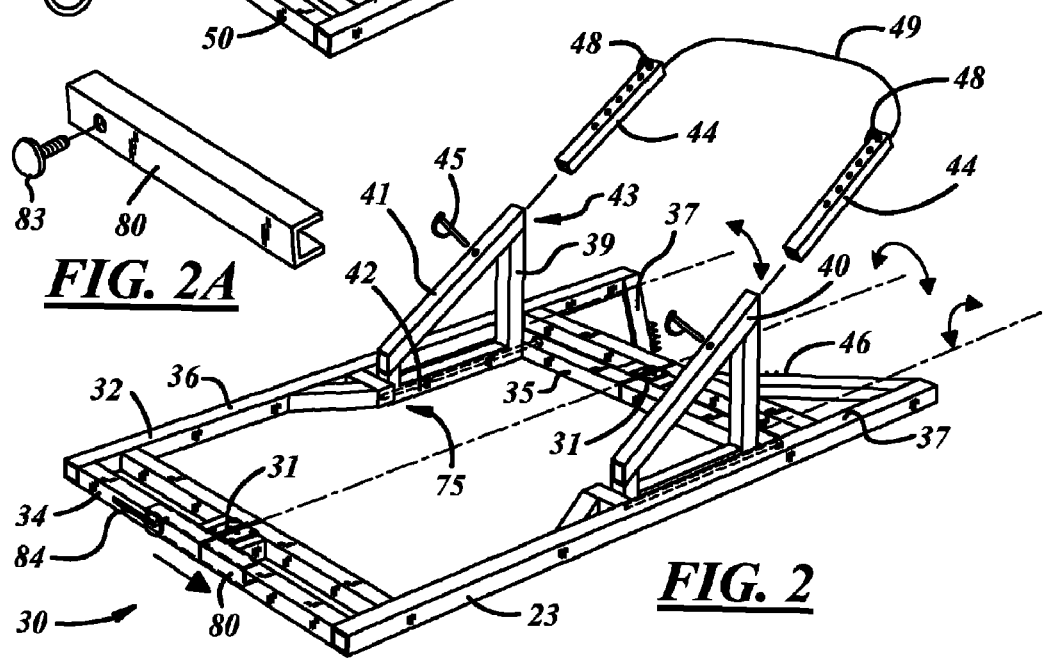
FIG. 2A
FIG. 2

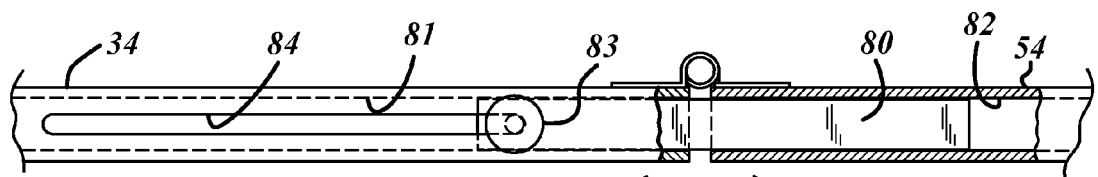
FIG. 5A
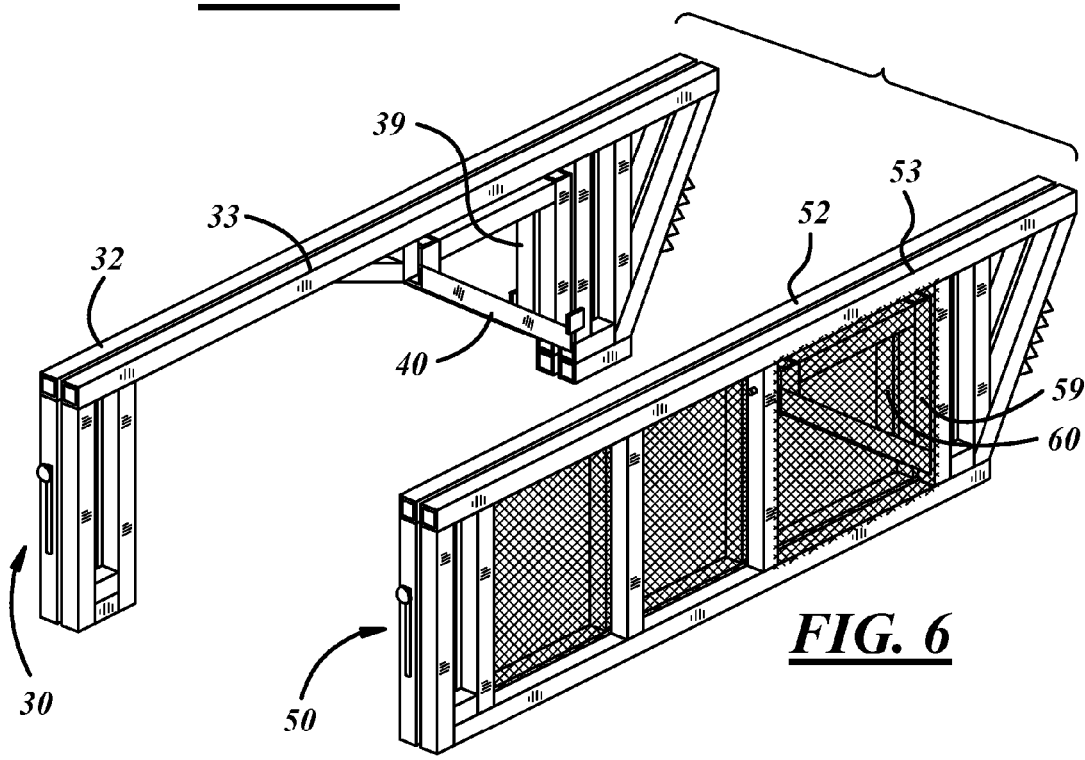
FIG. 6
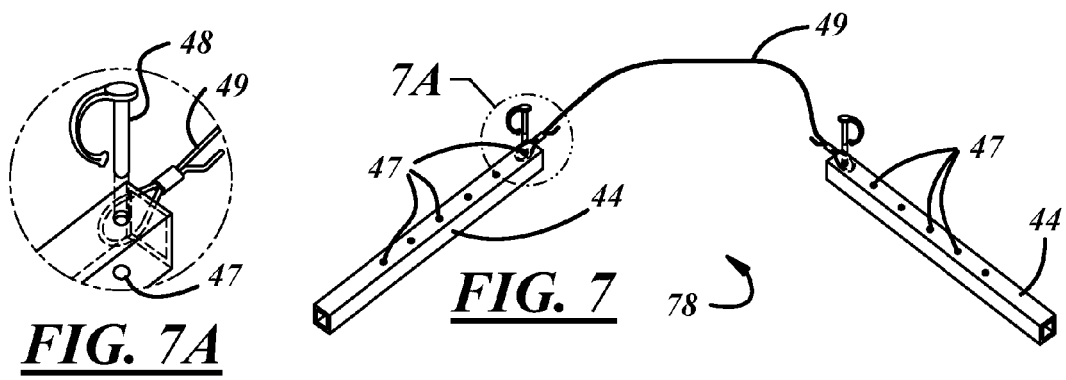
FIG. 7A
FIG. 7
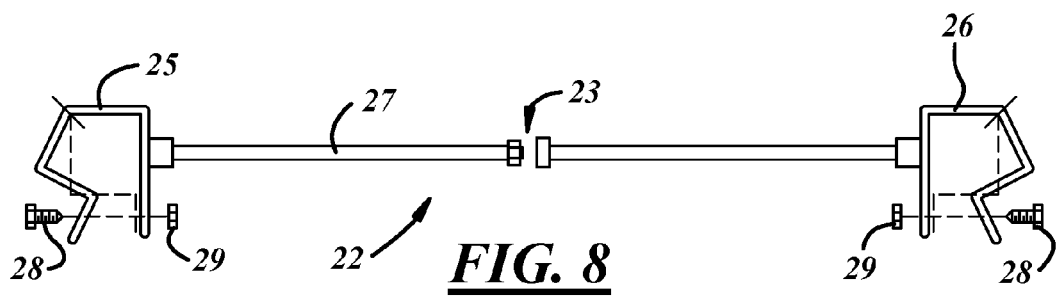
FIG. 8

OPERABLE CLIMBING TREE STAND

CROSS-REFERENCE TO RELATED APPLICATIONS

The present invention is related to application entitled "OPERABLE CLIMBING TREE STAND" filed simultaneously herewith and incorporated by reference herein.

TECHNICAL FIELD

The present invention relates to climbing tree stands and more particularly to a portable climbing tree stand.

BACKGROUND

Tree stands, in particular climbing tree stands, are well known in the art. Such stands may be placed on a tree or pole and used to elevate the hunter or other user to a desired height for observing nature, working or hunting game animals such as deer.

Climbing tree stands generally have a lower climbing member upon which the hunter stands and an upper climbing member upon which the hunter sits. Each of the upper and lower climbing members have a toothed or jaw member for biting the front side of the tree and a cable or blade device attached to the climbing member which encircles the backside of the tree, thereby supporting the climbing member in a cantilevered position. The jaws or blades bite into the tree, by pivotal action of the climbing member, to hold each climbing member in place after the tree stand is located in the desired position on the tree. Each climbing member may be released or repositioned by simultaneously raising or lifting the climbing member while releasing the cable or blade device encircled about the tree to pivotally disengage the climbing member. The lower climbing member includes foot straps or foot receiving members that are required to be engaged by a hunter for manipulating the position of the lower climbing member. The hunter typically manipulates and positions the upper climbing member with his hands.

When the lower climbing member is within the reach of the hunter, the hunter can use his feet to engage the lower climbing member and together with the upper climbing member may climb the tree as is well understood in the prior art. However, a problem encountered with climbing tree stands occurs when the user steps too close to the tree on the lower climbing member, causing the lower climbing member to lose its bite or connection to the tree and slides down the tree. To overcome this problem, the upper and lower climbing members are tied together with a retrieving rope so that there is little possibility of losing the lower climbing member. In this way, the rope is used to retrieve the lower climbing member should it get beyond the hunter's reach. However, the rope does not prevent the climbing members from becoming operatively disassociated from one another. In this regard, a shorter rope may interfere with the climbing ability of the climbing tree stand and would resultantly also be undesirable for keeping the climbing members operatively associated with one another.

Foot straps or foot receiving members found on climbing tree stands secure the user's feet to the lower climbing member in an attempt to allow the hunter to control the position of the lower climbing member. However, foot straps or foot receiving members are very awkward for the hunter due to body position and the size of hunting boots. The straps or receiving members provide an encumbrance to the hunter's motion. It would be desirable to eliminate the need for foot straps or foot receiving members, while still providing for the functionality of the climbing tree stand without inhibiting the hunter's motion.

Because the climbing members are bulky and difficult to pack or carry, the above-mentioned retrieving rope may be used to tie the lower and upper climbing member together. However, even with the climbing members tied together, the climbing tree stand remains bulky and difficult to carry, especially in dense forest or foliage. Also, the support arms that are rigidly fixed to the climbing member and extend upward therefrom also lend to the bulkiness of the climbing tree stand and may also become entangled with tree limbs and other foliage while hauling. The support arms provide attachment support to the climbing member for the cable or blade device, thereby allowing for pivotal deployment of the climbing members into its cantilevered position upon a tree. U.S. Pat. No. 4,553,634 entitled "Tree Stand" discloses a tree stand in which the support arms are pivotally connected and may swing into an inoperative position. However, the support arms extend undesirably beyond the contained platform member such that the support arms are likely to be caught up in trees or shrubs while walking through foliage. Moreover, the supports arms are likely to make undesirably loud noise while being transported.

Therefore, there is a need for an improved climbing tree stand that keeps the upper and lower climbing members operatively associated with one another. It would also be advantageous to provide a climbing tree stand that eliminates the need for foot straps or attachment members on the lower climbing member.

SUMMARY

Accordingly, a climbing tree stand is provided that advantageously keeps the upper and lower climbing platforms operatively associated with one another. The climbing tree stand advantageously eliminates the need for foot straps or attachment members on the lower climbing platform.

A climbing tree stand platform includes a platform member having a back member and a front member separated by a first side member and a second side member, a first arm and a second arm that each extend angularly upward from the platform toward the back member, and a securing member connected between the first arm and the second arm. A first elasticized member having a first end is connected to the platform member toward the first side member and a second elasticized member having a first end is connected to the platform member toward the second side member. The back member of the platform member may selectively engage an upright support or tree while the securing member selectively surrounds it, thereby providing cantilevered support for the platform member. The first elasticized member and the second elasticized member are operatively attachable to a second platform member.

Other advantages and features of the present invention will become apparent when viewed in light of the detailed description of the preferred embodiment when taken in conjunction with the attached drawings and appended claims.

BRIEF DESCRIPTION OF THE DRAWINGS

For a more complete understanding of this invention, reference should now be made to the embodiments illustrated in greater detail in the accompanying drawings and described below by way of examples of the invention.

FIG. 1 shows a perspective view of a climbing tree stand system being used to advantage in accordance with the invention.

FIG. 2 shows a perspective view of an upper platform in accordance with the embodiment shown in FIG. 1.

FIG. 2A shows a slidelock in accordance with the invention.

FIG. 5A shows a partial cross-sectional view of the slidelock rigidly securing the first section and the second section in accordance with the embodiment shown in FIG. 5.

FIG. 6 shows an isomeric view of the climbing tree stand system compactly folded for packing in accordance with the invention.

FIG. 7 shows the securing member in accordance with the invention.

FIG. 7A shows a partial assembly view of the securing member as shown in FIG. 7.

FIG. 8 shows a plan view of the elasticized rope member according to FIG. 1.

DETAILED DESCRIPTION OF THE PREFERRED EMBODIMENT

Figure 3:
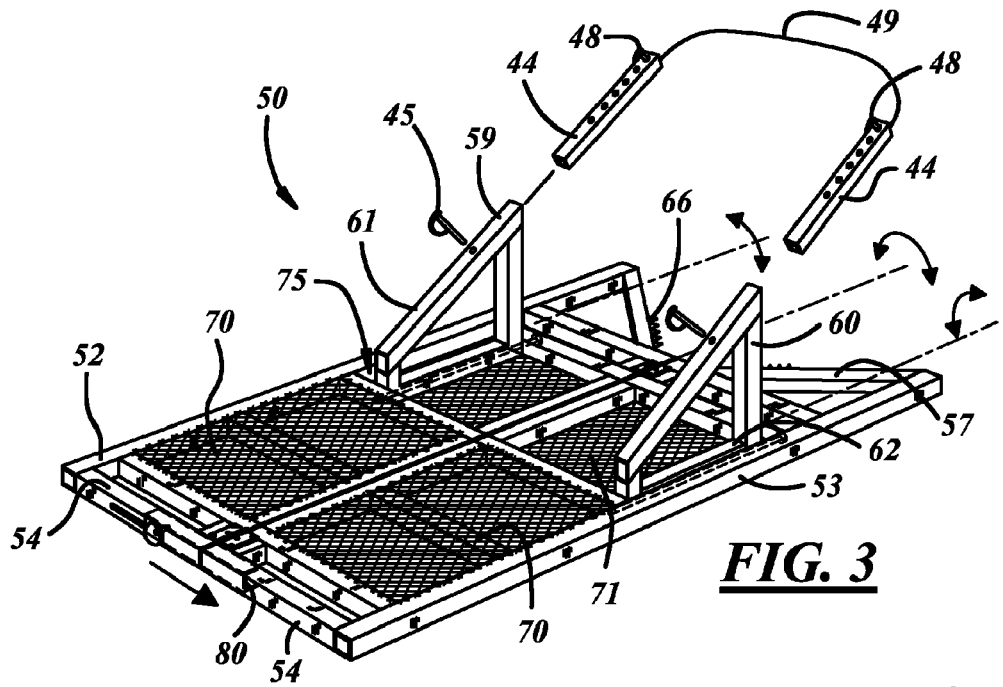
FIG. 3 shows a perspective view of a lower platform in accordance with the embodiment shown in FIG. 1.

In the following description, various operating parameters and components are described for one or more constructed embodiments. These specific parameters and components are included as examples and are not meant to be limiting.

FIG. 1 shows a perspective view of a climbing tree stand system 20 being used to advantage in accordance with the invention. The climbing tree stand system 20, shown attached to a tree 21, includes an upper member or platform 30 operatively connected to a lower member or platform 50 by elasticized rope members 22, 24. The elasticized rope members 22, 24 provide a restoring force when stretched beyond their free length by either platform 30, 50, thereby providing self return of the lower platform 30. The elasticized rope members 22, 24 eliminate the need for foot straps or foot members typically required to raise or lower the platform.

The elasticized rope members 22, 24 each have an upper end 25 and a lower end 26. The upper end 25 of each elasticized rope member 22, 24 is connected to opposite sides of the upper platform 30, while the lower end 26 of each member 22, 24 is connected to respective opposite sides of the lower platform 50. The elasticized rope members 22, 24 may have different lengths and or spring constants, but have the same length and spring constant for the embodiment here shown. The free length of the elasticized rope members 22, 24 is selected or adjusted by the user so that the lower platform 50 provides for comfortable seating while still providing for the operative action required for climbing, e.g., the free length of the elasticized rope member being just shorter than a lower leg of an adult male.

The upper end 25 of each elasticized rope member 22, 24 may be connected forward or backward of the cantilevered center of gravity of the upper platform 30, but is shown here being connected approximately at the platform's cantilevered center of gravity. The elasticized rope members 22, 24 connected to the lower platform 50 will enhance the upper platform's 30 securement to the tree 21 by providing additional downward loading and engagement loading thereon. A user may detach the upper platform 30 for adjustment up or down the tree 21 while standing on the lower platform 50.

The lower end 26 of each elasticized rope member 22, 24 may be connected forward or backward of the cantilevered center of gravity of the lower platform 50, but is shown here being connected approximately at the platform's cantilevered center of gravity. If the lower end 26 of each elasticized rope member 22, 24 is connected too far forward of the cantilevered center of gravity, then the lower member 50 may become inoperable or will not properly engage the tree 21. If the lower end 26 of each elasticized rope member 22, 24 is connected to far behind the cantilevered center of gravity, a user may have difficulties in releasing or disengaging the lower platform 50 from the tree 21. In this regard, a user may raise the lower platform 50 by first raising the upper platform 30 and increasing the spring force in the elasticized rope members 22, 24 and then lifting his feet, thereby allowing the restoring force in the rope members 22, 24 to raise the platform 50. However, the lowering of the lower platform 50 requires strategic or approximate placement of the user's feet upon the lower platform 50 between the elasticized rope members 22, 24 and the tree 21 while exerting a downward force upon the lower platform 50 thereby increasing the spring force in the elasticized rope members 22, 24. The lowering of the lower platform 50 is completed when the upper platform 30 is carefully lowered thereby restoring the elasticized rope members 22, 24 to their free length and decreasing the spring force within the elasticized rope members, else the lower platform 50 will have a tendency to climb back up until the spring force is minimized.

FIG. 8 shows a plan view of the elasticized rope member 22 according to FIG. 1. Elasticized rope member 22 includes stretchable element 27, shown here as a bungee cord, but may include any other type of elasticized strap, belt or rope. The stretchable element 27 is connected between the upper and lower ends 25, 26, which are selectively connectable to each platform as described. The upper and lower ends 25, 26 are each securable to the platforms by tightening bracket bolt 28 and nut 29. While a particular attachment is shown in FIGS. 1 and 8, it is recognized that various alternatives for attaching the elasticized rope member 22 to the platforms 30, 50 are available. Optionally, the stretchable element 27 may be directly attached to each platform. Also, the stretchable element 27 may optionally include a quick release connector 23 to facilitate assembly and removal of the climbing tree stand system 20.

Figure 9:
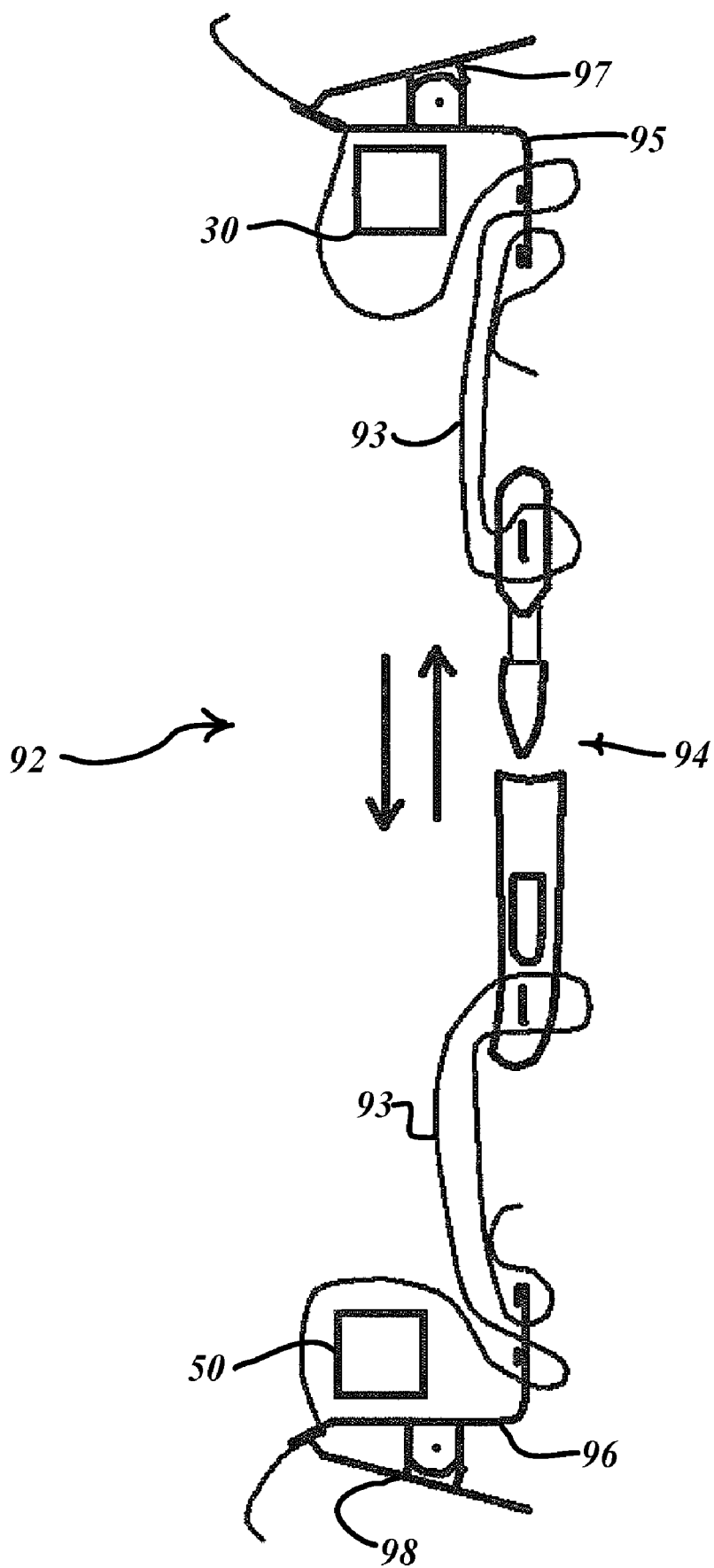
FIG. 9 shows a plan view of a second embodiment of an elasticized member assembly usable to advantage with the invention.

FIG. 9 shows a plan view of a second embodiment of an elasticized member assembly 92 usable to advantage with the invention. Elasticized member assembly 92 includes elasticized or stretchable straps 93, each shown here as a bungee strap, but may include any other type of elasticized strap, belt or rope. The stretchable straps 93 are connected between the upper and lower end connectors 95, 96, which are selectively connectable to each platform 30 and 50, as described herein. The upper and lower end connectors 95, 96 adjustably secure the straps 93 to the platforms by spring retention clips 97, 98. The elasticized member assembly 92 includes a quick release connector assembly 94 for connecting the stretchable straps 93, thereby facilitating assembly of the climbing tree stand system.

Figure 4:
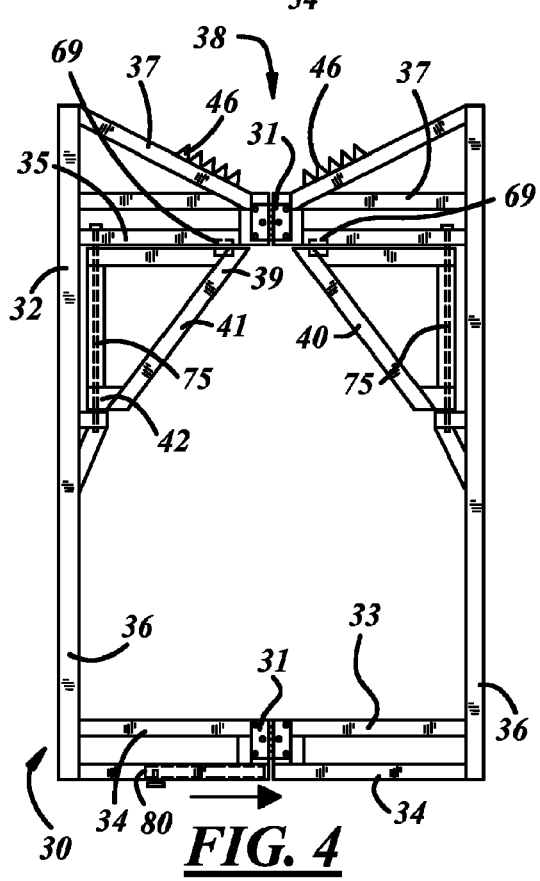
FIG. 4 shows a top view of the upper platform 30 in accordance with the embodiment shown in FIG. 2.

FIG. 2 shows a perspective view of an upper platform 30 in accordance with the embodiment shown in FIG. 1. FIG. 4 shows a top view of the upper platform 30 in accordance with the embodiment shown in FIG. 2. The upper platform 30 includes a first section 32 and a second section 33 separated by hinges 31 wherein the sections 32, 33 can compactly fold onto each other. The first section 32 and the second section 33 are generally symmetric about hinges 31, therefore similar parts are representatively discussed generally for the first section. It is recognized that while the sections 32 and 33 are generally symmetric, they may have different sizes or proportions consistent with the invention here presented. The first section 32 includes a front frame member 34 and a back frame member 35 separated by a side frame member 36. The frame members 34, 35 and 36 substantially define a compact plane in which the first section 32 conforms and is generally C-shaped for providing an opening in which a person will fit through. The front frame member 34 receives one hinge 31 and the back frame member 35 receives another hinge 31 thereby allowing the planar first section 32 to be rotated and received by the substantially similar planer second section 33. The first section 32 is rectilinear in shape, however it is recognized that other shapes may be utilized to advantage to form the first section. The members 34, 35 and 36 are each made from steel square tubing welded together, however they may also be from other structural shapes and materials, including rounds, L's, bars, pipe, and made from plastics, aluminum or other materials, respectively, for example. Also, the members 34, 35 and 36 may be made from a continuous piece of stock material or may be made from separate pieces of material that are appropriately joined as is understood by a person of skill in the art. The first section 32 may include additional support members in order to structurally strengthen the platform. A triangular shaped member 37 provides support for and completes the connection between the side frame member 36 and the back frame member 35, such that when the second section 33 and the first section 32 are folded into the same plane, each of the triangular shaped members 37 of each section 33, 32 form a V-shaped contacting member 38 for engaging a tree. The triangular shaped member 37 may optionally include a friction or tooth element 46 for providing additional securement when engaging a tree or pole.

The first section 32 and the second section 33 further include pivot arm support members 39, 40 that pivotally rotate from the plane of each section into a near perpendicular position, respectively. The pivot arm support member 39 includes an arm or triangular member 41 and a base 42. The base 42 of the pivot arm support member 39 is rotationally connected to the members of the first section 32 by a retaining rod 75, thereby allowing pivotal rotation of the pivot arm support member 39 in and out of the plane of the section 32. The retaining rod 75 may be a pin or hinge-like structure that allows for the structural attachment of the pivot arm support members 39, 40 while providing the pivotal functionality as provided herein. In this regard, the pivot arm support members 39, 40 may pivot toward or away from a tree or pole thereby facilitating adjustment or positioning of the climbing tree stand system 20. The triangular member 41, although not necessarily triangular, includes upward angled receiving channel 43 that positionably and releasably receives an adjusting member 44 of a securing member 78 that is securable by a locking pin 45 thereto. As shown in FIG. 7, the adjusting member 44 includes user selectable pin outs 47 for receiving the locking pin 45 for securing to the triangular member 41 or cable pin 48 for selectively securing a securing member or cable 49. FIG. 7A shows a partial assembly view of the securing member 78 as shown in FIG. 7. The pin outs 47 allow the adjusting member 44 to be adjusted to advantageously conform to various sizes of trees or poles. While the cable 49 is shown connected to the adjusting member 44 releasably attachable to the triangular member 41 by pins 48 and 45, respectively, other fasteners or attachment methods may be used to accomplish the same purpose. Also, the pivot arm support members 39, 40 may optionally include a backstop 69 that prevents the pivot arm support members from rotating beyond the plane when stored into a compact position.

FIG. 2A shows a slidelock 80 in accordance with the invention. The upper platform 30 includes a slidelock or bar 80 positionably engaging a first channel slot 81 in the front frame member 34 of the first section 32. When the first section 32 and the second section 33 of the upper platform 30 lie in the same plane, the bar 80 can be positionably slid into a second channel slot 82 of the second section 33 to rigidly secure the sections 32, 33 for use. The bar 80 may also include a retainment knob 83 that engages a keyway 84 in the front frame member 34 of the first section 32. The retainment knob 83 is a threaded or compressive fastener that is capable of sandwiching the front frame member 34 to secure the bar 80. The retainment knob may also be used to position the bar 80. While the slidelock or bar 80 is shown engaging a first channel slot 81 in the front frame member 34 of the first section 32 for engagement with a second channel slot 82 of the second section 33, the bar 80 may be utilized to advantage in another frame member or may be any securing system that may rigidly hold the first section 32 and the second section 33 in substantially the same plane.

Figure 5:
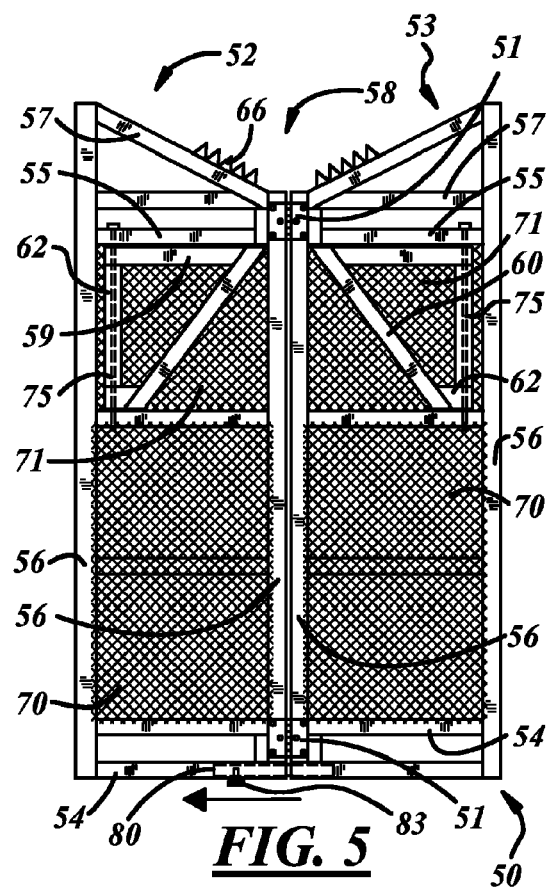
FIG. 5 shows a top view of the upper platform in accordance with the embodiment shown in FIG. 3.

FIG. 3 shows a perspective view of a lower platform 50 in accordance with the embodiment shown in FIG. 1. FIG. 5 shows a top view of the upper platform 50 in accordance with the embodiment shown in FIG. 3. The lower platform 50 includes a first section 52 and a second section 53 separated by hinges 51 wherein the sections 52, 53 can compactly fold onto each other. It is recognized that while two hinges 31 are shown, one or more hinges may be utilized to advantage. The first section 52 and the second section 53 are generally symmetric about hinges 51, therefore similar parts are representatively discussed generally for the first section. The first section 52 includes a front frame member 54 and a back frame member 55 separated by a side frame member 56. The frame members 54, 55, and 56 substantially define a compact plane in which the first section 52 provides a first surface 70 which a person may stand upon. The front frame member 54 receives one hinge 51 and the back frame member 55 receives another hinge 51 thereby allowing the planer first section 52 to be rotated onto a substantially similar planer second section 53. The first section 52 is rectilinear in shape, however it is recognized that other shapes may be utilized to advantage to form the first section. The members 54, 55 and 56 are each made from steel square tubing welded together, however they may also be from other structural shapes and materials, including rounds, L's, bars, pipe, and made from plastics, aluminum or other materials, respectively, for example. Also, the members may be made from a continuous piece of stock material or may be made from separate pieces of material that are appropriately joined as is understood in the prior art. The first section 52 may include additional support members in order to structurally strengthen the platform. A triangular shaped member 57 provides support for and completes the connection between the side frame members 56 and the back frame member 55, such that when the second section 53 and first section 52 are folded into the same plane, each of the triangular shaped members 57 of each section 53, 52 form a V-shaped contacting member 58 for engaging a tree. The triangular shaped member 57 may optionally include a friction or tooth element 66 for providing additional securement when engaging a tree or pole.

The first section 52 and the second section 53 further include pivot arm support members 59, 60 that pivotally rotate from the plane of each section into a near perpendicular position, respectively. The pivot arm support member 59 includes an arm or triangular member 61 and a base 62. The base 62 of the pivot arm support member 59 is rotationally connected to the members of the first section 52 by a retaining rod 75, thereby allowing pivotal rotation of the pivot arm support member 59 in and out of the plane of the section 52. The retaining rod 75 may be a pin or hinge-like structure that allows for the structural attachment of the pivot arm support members 59, 60 while providing the pivotal functionality as provided herein. In this regard, the pivot arm support members 59, 60 may pivot toward or away from a tree or pole thereby also facilitating adjustment or positioning of the climbing tree stand system 20. The triangular member 61, although not necessarily triangular, includes upward angled receiving channel 63 that positionably and releasably receives an adjusting member 44 of a securing member 78 that is securable by a locking pin 45, thereto. As shown in FIG. 7, the adjusting member 44 includes user selectable pin outs 47 for receiving the locking pin 45 for securing to the triangular member 61 or cable pin 48 for selectively securing a securing member or cable 49. FIG. 7A shows a partial assembly view of the securing member 78 as shown in FIG. 7. The pin outs 47 allow the adjusting member 44 to be adjusted to advantageously conform to various sizes of trees or poles. While the cable 49 is shown connected to the adjusting member 44 and releasably attachable to the triangular member 61 by pins 48 and 45, respectively, other fasteners or attachment methods may be used to accomplish the same purpose. Also, the pivot arm support members 59, 60 can compactly fold into the plane created by the frame members 54, 55, 56 and against a second surface 71 that prevents the pivot arm support members from rotating beyond the plane when stored into a compact position. The second surface 71 on the lower platform 50 also provides additional standing area for a user. The second surface 71 may also help the user to pivotally release the lower platform 50 from a tree or pole by providing a place to exert a gravitational offset force.

FIG. 5A shows a partial cross-sectional view of the slide-lock 80 rigidly securing the first section 62 and the second section 63 in accordance with the embodiment shown in FIG. 5. The lower platform 50 also includes a slidelock or bar 80 for securing the first section 62 and the second section 63 in the same plane, as described herein for the upper platform 30.

FIG. 6 shows an isomeric view of the climbing tree stand system 20 compactly folded for packing in accordance with the invention. Sections 32 and 33 of the upper platform 30 are folded into a packed position. Likewise, the sections 52 and 53 of the lower platform 50 are folded, thereby allowing the upper and lower platforms to be conveniently packed together. Also, the arms 39 and 40, and the arms 59 and 60 of the platforms 30, 50, respectively, are stored conveniently therein.

The climbing tree stand system 20 may include other features that are typically associated with climbing tree stands such as accessory supports, a ladder, gun or binocular racks, or a positionable or hanging seat. Furthermore, the climbing tree stand system 20 may optionally include a rope or tether 90 tied between the lower platform 50 and the upper platform 30 for retrieving the lower platform 50 should it inadvertently fall beyond the reach of the user and the elasticized members 22, 24 fail.

While particular embodiments of the invention have been shown and described, numerous variations and alternate embodiments will occur to those skilled in the art. Accordingly, it is intended that the invention be limited only in terms of the appended claims.

What is claimed is:

1. A climbing tree stand platform comprising:
   a platform member comprising a back member and a front member separated by a first side member and a second side member;
   a first arm extending angularly upward from said platform toward said back member;
   a second arm extending angularly upward from said platform toward said back member;
   a securing member coupled between said first arm and said second arm;
   a first elasticized member having a first end coupled to said platform member toward said first side member; and
   a second elasticized member having a first end coupled to said platform member toward said second side member,
   wherein said back member is configured to engage an upright support and said securing member selectively surrounds said upright support for providing cantilevered support toward said front member,
   wherein said first elasticized member and said second elasticized member are directly attached to a second platform member; a second platform member comprising a back member and a front member separated by a first side member and a second side member, wherein a second end of said first elasticized member is coupled to said second platform member toward said first side member and a second end of said second elasticized member is coupled to said platform member toward said second side member.

2. The climbing tree stand platform of claim 1 wherein at least one of said elasticized member includes a release connector for releasably connecting said second platform member to said platform member.

3. The climbing tree stand platform of claim 2 wherein said release connector is a quick release connector.

4. The climbing tree stand platform of claim 1 wherein at least one of said elasticized members is an elasticized rope.

5. The climbing tree stand platform of claim 4 wherein said elasticized rope is a bungee cord.

6. The climbing tree stand platform of claim 1 wherein each of said elasticized members has similar spring constants.

7. The climbing tree stand platform of claim 1 wherein each of said elasticized members has substantially same free lengths.

8. The climbing tree stand platform of claim 1 wherein each of said elasticized members has substantially same free lengths and similar spring constants.

9. The climbing tree stand platform of claim 1 wherein the free length of at least one of said elasticized members is adjustable.

10. The climbing tree stand platform of claim 1 wherein said first end of at least one of said elasticized members is coupled substantially about said platform's cantilevered center of gravity.

11. The climbing tree stand platform of claim 1 wherein said first end of at least one of said elasticized members is coupled behind said platform's cantilevered center of gravity.

12. A climbing tree stand system comprising:
    an upper member comprising an upper back member and an upper front member separated by an upper first side member and an upper second side member,
    an upper first arm extending angularly upward from said upper member toward said upper back member,
    an upper second arm extending angularly upward from said upper member toward said upper back member, and
    an upper securing member coupled between said upper first arm and said upper second arm;

a lower member comprising a lower back member and a lower front member separated by a lower first side member and a lower second side member, a lower first arm extending angularly upward from said lower member toward said lower back member, a lower second arm extending angularly upward from said lower member toward said lower back member, and a lower securing member coupled between said lower first arm and said lower second arm;

a first elasticized member having a lower end coupled to said lower member toward said lower first side member and an upper end coupled directly to said upper member toward said upper first side member;

and a second elasticized member having a lower end coupled to said lower member toward said lower second side member and an upper end coupled directly to said upper member toward said upper second side member, wherein said upper member and said lower member members are configured to engage an upright support for cantilevered retention thereto, and said first elasticized member and said second elasticized member operatively facilitate climbing of said upper member and said lower member by a user thereon.

13. The system of claim 12 wherein at least one of said elasticized member includes a quick release connector for releasably connecting said upper member to said lower member.

14. The system of claim 12 wherein at least one of said elasticized members is an elasticized rope.

15. The system of claim 12 wherein each of said elasticized members has substantially same lengths and similar spring constants.

16. The system of claim 12 wherein the free length of at least one of said elasticized members is adjustable.

17. The system of claim 12 wherein said respective lower ends and said respective upper ends of said elasticized members are coupled to respective side members at about or behind said lower and upper member's cantilevered center of gravity.

18. A climbing tree stand comprising:

an upper platform comprising an upper back member and an upper front member separated by an upper first side member and an upper second side member, an upper first arm extending angularly upward from said upper platform toward said upper back member, an upper second arm extending angularly upward from said upper platform toward said upper back member, and an upper securing member coupled between said upper first arm and said upper second arm;

a standing platform comprising a lower back member and a lower front member separated by a lower first side member and a lower second side member, a lower first arm extending angularly upward from said standing platform toward said lower back member, a lower second arm extending angularly upward from said standing platform toward said lower back member, and a lower securing member coupled between said lower first aim and said lower second arm;

a first elasticized rope having a first lower end coupled to said lower first side member of said standing platform and a first upper end coupled directly to said upper first side member of said upper platform; and a second elasticized rope having a second lower end coupled to said lower second side member of said standing platform and a second upper end coupled directly to said upper second side member of said upper platform, wherein said upper platform and said standing platform are configured to engage an upright support for cantilevered retention thereto, and said first elasticized rope and said second elasticized rope operatively facilitate climbing of said upper platform and said standing platform by a user thereon.

19. The climbing tree stand of claim 18 wherein said respective ends of said first elasticized rope and said second elasticized rope are selectively and adjustably attachable to said respective side members of said standing platform and said upper platform, wherein said first and second back members are configured to engage an upright support and said securing member selectively surrounds said upright support for providing cantilevered support when said first section and said second section are folded into said platform position.

* * * * *